United States Patent [19]

Koch

[11] Patent Number: 5,001,330

[45] Date of Patent: Mar. 19, 1991

[54] OPTICALLY SCANNED DOCUMENT WITH FAIL-SAFE MARKING

[75] Inventor: Vernon F. Koch, Prior Lake, Minn.

[73] Assignee: National Computer Systems, Inc., Eden Prairie, Minn.

[21] Appl. No.: 163,055

[22] Filed: Mar. 2, 1988

[51] Int. Cl.$^5$ ............................................. G06K 7/00
[52] U.S. Cl. .................................. 235/436; 235/454; 235/494; 283/72
[58] Field of Search ............... 235/436, 454, 455, 456, 235/494; 250/566, 568; 283/72

[56] References Cited

U.S. PATENT DOCUMENTS

| | | |
|---|---|---|
| 3,284,929 | 11/1966 | Azure ................................ 235/454 X |
| 3,317,715 | 5/1967 | Talbot et al. ..................... 235/494 X |
| 3,643,066 | 2/1972 | Coliz et al. . |
| 3,643,348 | 2/1972 | Azure . |
| 3,676,690 | 7/1972 | McMillin et al. . |
| 3,737,628 | 6/1973 | Azure . |
| 3,800,439 | 4/1974 | Sokolski et al. . |
| 3,861,063 | 1/1975 | Eisner . |
| 3,886,326 | 5/1975 | Horvath et al. . |
| 3,896,295 | 7/1975 | LaPlante . |
| 3,900,961 | 8/1975 | Sokolski et al. . |
| 4,174,891 | 11/1979 | Flint et al. . |
| 4,300,123 | 11/1981 | McMillin et al. . |
| 4,430,563 | 2/1984 | Harrington ..................... 235/456 X |
| 4,723,072 | 2/1988 | Naruse .............................. 235/454 |

Primary Examiner—David L. Trafton
Attorney, Agent, or Firm—Dorsey & Whitney

[57] ABSTRACT

A data processing form used with photosensing apparatus that senses the presence of indicia in indicia-receiving locations on the form comprises a sheet of paper or like material. The form has a first control mark column containing a plurality of control marks in specified relation to a plurality of indicia-receiving locations on a first surface of said sheet. On the second surface of the sheet is a fail-safe mark opposite to and aligned with the first control mark column. The fail-safe mark has a continuous extend sufficient to connect at least two adjacent marks on said first surface, were such control marks on the second surface of said sheet in a location immediately opposite their location on said first surface.

8 Claims, 3 Drawing Sheets

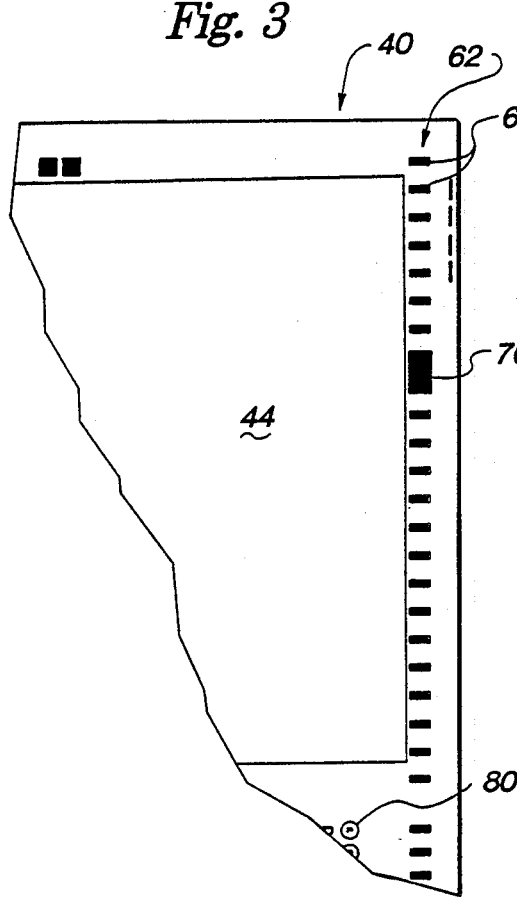
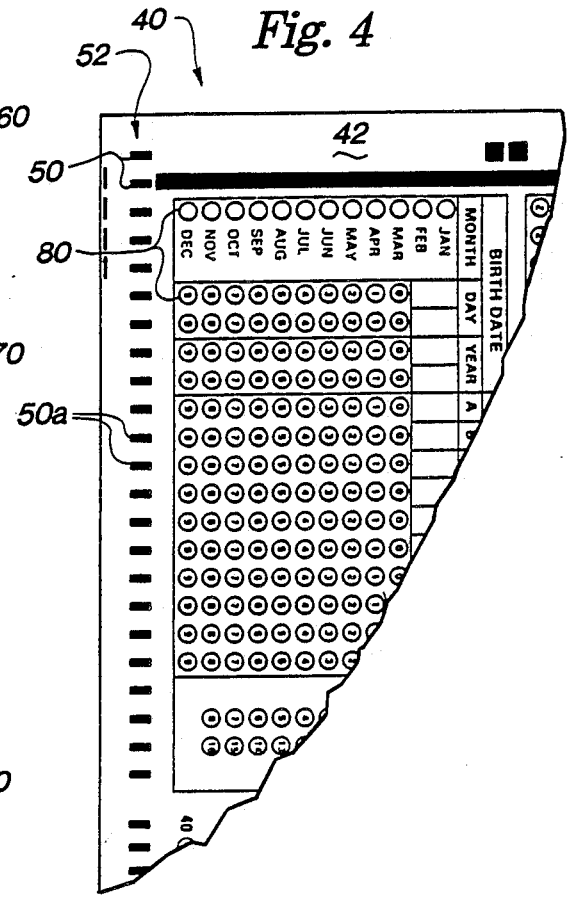
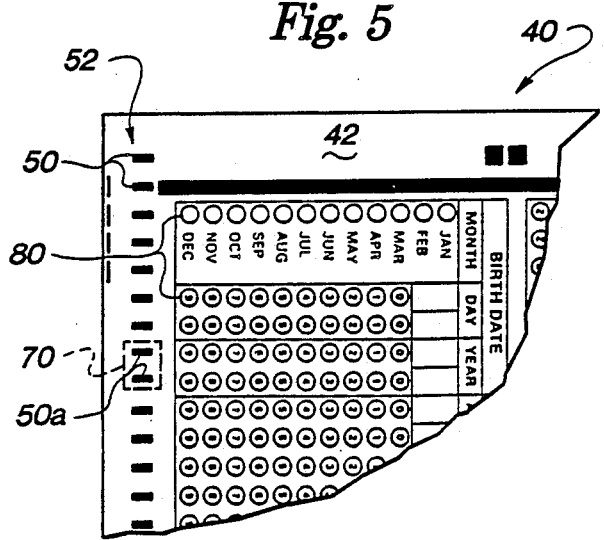

OPTICALLY SCANNED DOCUMENT WITH FAIL-SAFE MARKING

TECHNICAL FIELD

The present invention relates generally to the field of optically scanned documents. More particularly, the present invention relates to a scannable document having fail-safe marking so that it will be rejected when used in a scanning system with which it is not compatible.

DESCRIPTION OF THE PRIOR ART

Optical or conductive mark scanning systems of several types are well known in the prior art. The documents used in such system are sheets of paper or other material and typically have a plurality of preprinted control marks (sometimes called "timing marks") in a control mark column (sometimes called a "timing track") used to trigger the system to scan or "read" certain data marks or data response areas. The data response areas are placed in a specified relation to the control marks. Usually, a firmware (PROM) or software template and data processing means are used to keep track of control marks and data marks. The processing means will normally be programmed to work with a specific document format, e.g., it will expect a certain number of control marks and a certain pattern of data response areas in relation to the control marks.

At least two distinct optical scanning methods are used to detect the presence of control marks and data marks or other indicia placed by users in data response areas. With the transmitted-read method, a light source placed at one surface of a document illuminates the area to be read and a photosensor placed at the opposite surface of the document is used to sense light that is transmitted through the document. When a mark is present, little or no light is transmitted through the document. By contrast, the absence of a mark means that significant light will pass through the document. The transmitted light is detected by the photosensor, and its output is processed by electrical circuitry to determine the presence or absence of a mark.

In the reflective-read method, both the light source and the photosensor are located on the same side of the document that is scanned. The photosensor accordingly receives reflected light when an area without a mark is illuminated. When a marked area is illuminated, the light sensor receives little or no reflected light. Again, the output of the photosensor is processed electronically to determine the presence or absence of a mark.

The difference between the two sensing methods is significant, because the reflective-read method is insensitive to any markings placed on the surface of the document opposite the surface being illuminated and scanned. With the transmitted-read technology, on the other hand, a mark on either surface of the document is sensed if it appears between the light source and the photosensor.

Despite the differences between the reflective-read and transmitted-read methods, documents intended for use with each method have similarities. Thus, a user may not notice that a group of scannable documents is of the reflective-read type rather than the transmitted-read type or vice versa. A problem that can arise, therefore, is that a document intended only for a reflective-read scanner, may be placed in a scanner operating according to the transmitted-read method. Erroneous readings can then occur, because marks on either surface of the document may be detected, rather than marks only on the single surface intended to be scanned.

When the document formats for the two separate methods are completely different, the scanning equipment will normally encounter an error and reject a document that it attempts to scan but that is in a format for which the equipment is not built or programmed. When the formats of documents used for both methods are the same or similar, however, a scannable document intended for a reflective-read scanner only may be erroneously accepted and read by a scanner using transmitted-read technology. A certain level of paper opacity and fiber uniformity is required for proper transmitted-read scanning. Because a transmitted read scanner does not directly sense these qualities, it will attempt to "read" through any document that has a format within its general parameters. Using standard grade reflective-read paper in a transmitted-read environment can therefore lead to serious errors. Because scannable documents often contain highly important information, such as responses to tests that affect career opportunities, avoiding erroneous document reading is important. Accordingly, there is a need for scannable documents designed for reflective-read technology that are also designed to be rejected when erroneously inserted in a scanner using transmitted-read technology.

SUMMARY OF THE INVENTION

A data processing form in accordance with the present invention is used with photosensing apparatus that senses the presence of indicia in indicia-receiving locations on the form. The form comprises a sheet of paper or like material having a first control mark column containing a plurality of control marks in specified relation to a plurality of indicia-receiving locations on a first surface of said sheet. On the second surface of the sheet is a fail-safe mark opposite to and aligned with the first control mark column on the first surface. The fail-safe mark has a length sufficient to connect at least two adjacent control marks on said first surface, were such control marks on the second surface of said sheet in a location immediately opposite their location on said first surface. In one embodiment, the second surface of the sheet, having the fail-safe mark, also has a control mark column with associated indicia receiving locations.

A primary objective of the present invention is to provide an optically scannable form for reflective-read scanning equipment that will not be accepted in transmitted-read scanning equipment.

Another objective of the present invention is to provide an optically scannable form with a fail-safe marking on one surface that does not interfere with reflective-read scanning of said one surface but causes an error to be registered when transmitted read-scanning of the surface opposite the fail safe marking occurs.

A further objective of the present invention is to provide an optically scannable form that can be scanned on one or both sides by a reflective-read scanner, but that will cause an error to be registered when one side is read by a transmitted-read scanner.

These and other objectives of the present invention will become apparent with reference to the drawings, the description of the preferred embodiment and the appended claims.

DESCRIPTION OF THE DRAWINGS

FIG. 3 is a fragmentary bottom plan view of the inventive form when both surfaces of the form have indicia-receiving areas.

FIG. 4 is a fragmentary top plan view of the inventive form of FIG. 3.

FIG. 5 is a fragmentary top plan view as in FIG. 4 but with the fail-safe mark shown in hidden lines.

DESCRIPTION OF THE PREFERRED EMBODIMENT

Figure 1:
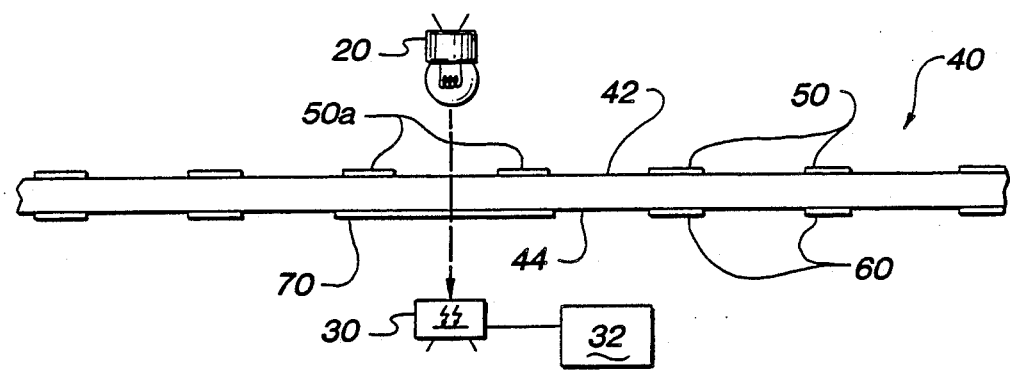
FIG. 1 is a simplified functional diagram of a form according to the present invention in a transmitted-read scanner environment.
Figure 2:
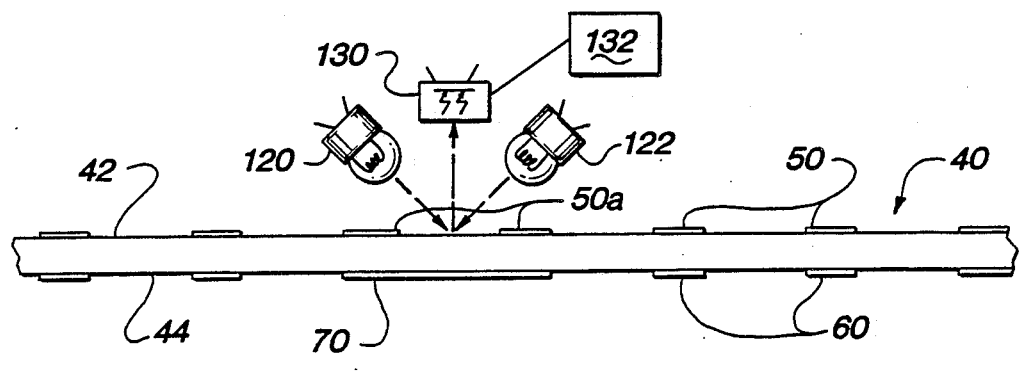
FIG. 2 is a simplified functional diagram of a form according to the present invention in a reflective-read scanner environment.

FIGS. 1 and 2 show the two basic methods for optical scanning of forms addressed by the present invention. In each method portions of a form are sequentially scanned. This is usually accomplished by transporting the scannable document or form through a scanning station forming part of scanning equipment. Such equipment (not shown here) usually includes a tray or other means for holding forms to be scanned, transport means to pick up a single document at a time and move it through the scanning station and an output tray or other means for holding forms that have been scanned. As the form is transported through the scanning station, optical sensing means is used to check for the presence or absence of marks or indicia in specified areas. This sensing means generates electrical signals that are processed to discriminate between the presence or absence of a mark. Data produced by the mark discriminating circuitry may be further processed by comparing it to a test answer key, developing a total or totals for marks of various kinds and storing data associated with a particular form and/or a group of forms for further processing. Scanning equipment of this general type is shown in U.S. Pat. Nos. 3,737,628 and 3,800,439.

FIG. 1 shows mark sensing by the transmitted-read method. Scannable form 40 has a top surface 42 and a bottom surface 44. Top surface 42 has a sequence of timing marks 50 forming a control mark column 52 (FIGS. 3, 4, 5). As best seen in FIG. 4, associated with the control marks 50 are a plurality of indicia-receiving locations 80, e.g., response areas when the form 40 is used as a test answer sheet or a survey form. As will be discussed in greater detail later, the form 40 may have control marks and indicia-receiving areas on only one surface or on both surfaces. As shown in FIGS. 1-5, the form utilizes both surfaces. Thus, FIG. 1 shows additional control marks 60 on the bottom surface 44. These are shown as aligned with and symmetrically located relative to the control marks 50 on the top surface, as is required for the transmitted-read environment.

The scanning means used in the transmitted-read method includes, as shown in FIG. 1, a light source 20 adjacent the top surface 42 and a photosensor 30 adjacent the bottom surface 44. The photosensor 30 receives light transmitted through the scannable form 40 (which must be made of a paper or other sheet material that enhances such transmission) when no mark is present to occlude the light. When a mark is present, little or no light may reach the photosensor 30. The electrical output of the photosensor 30 is received by data processing means 32 and processed to aid discrimination of mark and non-mark situations. (A scanner device using this scanning method is the Sentry 3000 scanner sold by National Computer Systems, Inc., of Eden Prairie, Minnesota.) The indicia receiving areas 80 on form 40 are in specified relation to the control marks 50, because sensing of a control mark 50 is used to trigger any desired sensing of possible marks in associated indicia-receiving areas 80. In addition, in a transmitted-read document, light absorbing marks on the bottom surface 44 of the document must not be superimposed on indicia-receiving areas 80 on the top surface 42 (and vice versa, if the bottom surface 44 also has indicia-receiving areas 80 and is scanned).

To achieve good discrimination between marks, non-marks, stray marks or smudges, the scanning system is usually designed, often using computer programs, to "look" precisely at areas to be marked and not at other areas. Depending on the application in which the form is used, only a portion of the indicia-receiving areas will contain potentially useful information. The system will be designed or programmed to ignore marks sensed in other areas.

FIG. 2 shows mark sensing by the reflective-read method. (Systems employing this method are described in greater detail in U.S. Pat. Nos. 3,676,690 and 4,300,123.) Scannable form 40 is the same in both FIG. 1 and FIG. 2. In FIG. 2 the scanning means adjacent top surface 42 comprises a pair of light sources 120, 122 placed so as to yield reflected light to photosensor 130 when no mark is present. When a mark is present, little or no light is reflected to photosensor 130. The output of photosensor 130 is received by data processing means 132 and processed in much the same manner as with transmitted-read photosensor 30 to discriminate marks and non-marks. To read both sides simultaneously, a further light source-photosensor combination can be placed adjacent bottom surface 44.

As will be evident from the explanation of the transmitted read and reflective-read methods, a mark on either the top surface 42 or the bottom surface 44 of the scannable form 40 is "seen" as a mark by the transmitted-read photosensor 30. By contrast, the reflective-read photosensor 130 "sees" only marks on the top surface 42 (unless the bottom surface 44 is also scanned, either simultaneously by another photosensor or in a later pass). When the control marks 50 and indicia-receiving areas 80 of a reflective-read form are formatted to be the same as or similar to the corresponding marks and areas in a transmitted-read form, there may be nothing to prevent a transmitted-read scanner from scanning a reflective-read form and totally misreading it.

The present invention offers a solution to this problem. It starts from the proposition that the data processing means of most scanning equipment is or can be programmed to expect to sense a fixed number of control marks 50 when a form 40 of a specified type is scanned. A count of such marks permits the data processing means to recognize certain error conditions, e.g., when a form of the wrong type, having too few or too many control marks, has been placed in the scanning equipment, or when smudges, stray marks or defects in a light source or photosensor cause too few or too many control marks 50 to be detected on a form actually bearing the proper number of control marks 50.

The invention involves the use of a special mark on forms intended only for reflective-read scanning, so that these forms will be rejected in a transmitted-read scanner. In particular, referring to FIGS. 1 and 2, the invention teaches the presence of a fail-safe mark 70 on the bottom surface 44 of scannable form 40. The segment of form 40 shown in FIGS. 1 and 2 has seven control marks 50 on its top surface 42. A reflective-read scanner photosenser 130 (FIG. 2) will "see" each of these seven control marks 50, absent abnormal conditions. A transmitted-read scanner photosensor 30 (FIG. 1) will see only six control marks, because the fail-safe mark 70 will cause the light from light source 20 to be continuously occluded between the two control marks 50a on the top surface 44 opposite the fail-safe mark 70. The two control marks 50a are, in effect, linked into one mark. Thus, when a transmitted-read scanner is programmed to look for seven control marks 50 and it finds only six, it can further be programmed to notify the operator of an error condition. A reflective-read scanner programmed to look for seven control marks 50 and receiving the same form will not see the fail-safe mark 70 when it scans the top surface 42. Accordingly, it will not see the control marks 50a as linked and will not note an error condition. It will scan normally.

When the bottom surface 44 of the form 40 is to be scanned as well, the reflective-read scanner must be programmed to expect the fail-safe mark 70, either ignoring it or treating it like an extended control mark. This can be accomplished by appropriate programming of data processing means 132.

FIGS. 3 and 4 show portions of the bottom and top surfaces 44, 42, respectively, of a scannable form 40 in accordance with the present invention. Both the bottom and top surfaces 44, 42, respectively, have control mark columns 62, 52, respectively and associated indicia-receiving areas 80. Fail-safe mark 70 is aligned with control mark column 62. FIG. 5 shows how the fail-safe mark 70 appears when the top surface 42 is scanned in a transmitted-read scanner. The fail-safe mark 70 extends continuously between two adjacent control marks 50a in control mark column 52, with which the fail-safe mark 70 is also aligned. Fail-safe mark 70 is positioned on bottom surface 44 immediately opposite the location of these two adjacent control marks 50a on the top surface.

While fail-safe mark 70 actually covers an area large enough to contain both of the two adjacent control marks 50a, it would be sufficient if it covered only an area sufficient to provide continuous connection between these two control marks. On the other hand, the invention could also be implemented by a fail-safe mark 70 large enough to cover the area of more than two adjacent control marks. (In fact, the fail-safe mark 70 could extend the full length of the control mark column 52.) What is necessary is that the control mark count in transmitted-read scanning of the form be different than expected, so that an error will be noted and the form rejected. In this respect, it is necessary that the two adjacent control marks 50a chosen be associated with actual-live data so that they will be part of the expected count of control marks 50.

Figure 6:
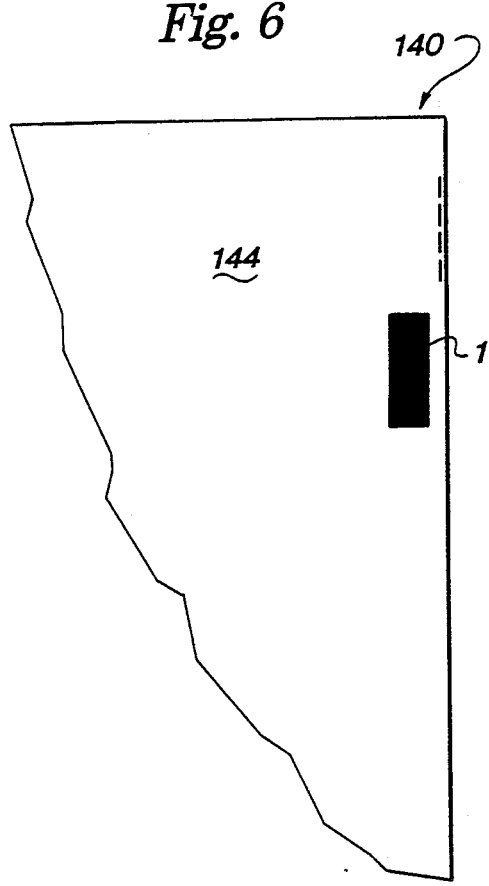
FIG. 6 is a fragmentary bottom plan view of the inventive form when only the top surface of the form has indicia-receiving areas.
Figure 7:
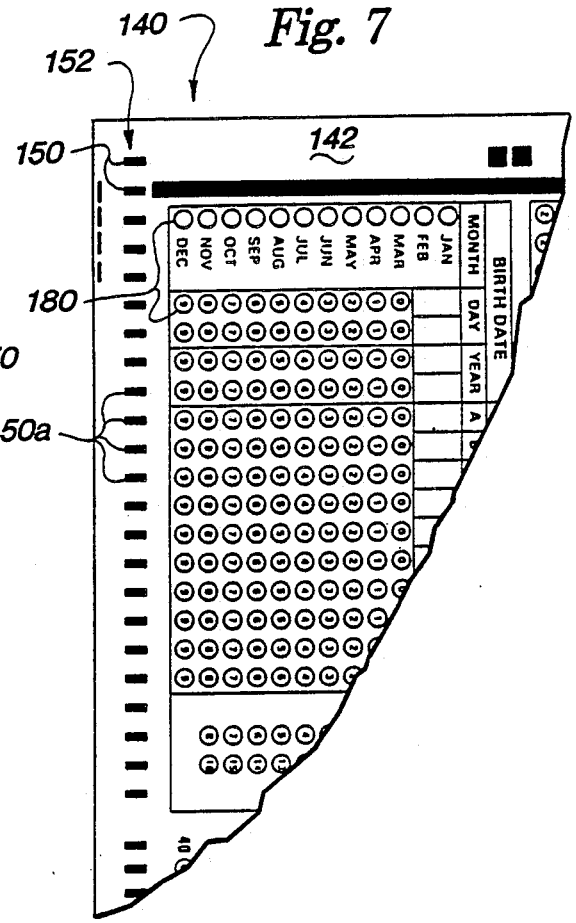
FIG. 7 is a fragmentary top plan view of the inventive form of FIG. 6.
Figure 8:
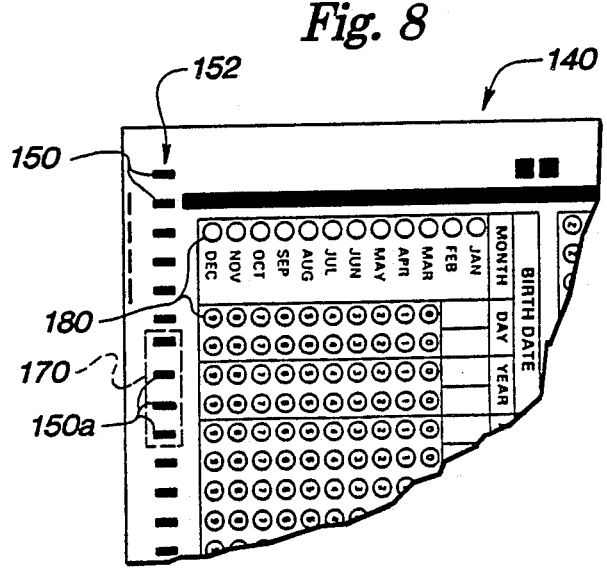
FIG. 8 is a fragmentary top plan view as in FIG. 7 but with the fail-safe mark shown in hidden lines.

FIGS. 6 and 7 show portions of the bottom and top surfaces 144, 142, respectively, of a scannable form 140 in accordance with the present invention. It differs from the form 40 of FIGS. 3–5 because it has a control mark column 152 (with a plurality of control marks 150) and associated indicia-receiving areas 180 on only the top surface 142. Here, the fail safe mark 170 appears on the bottom surface 144 without a corresponding control mark column on this bottom surface, but maintaining its aligned relationship with the control mark column 152 on the top surface. FIG. 8 shows how the fail-safe mark 170 looks in a transmitted-read scanner. In this example, it links four adjacent control marks 150a. This would reduce the transmitted-read control mark count by three relative to the reflective read count of the same control mark column.

Control marks, marks defining indicia-receiving areas and any accompanying text or graphics are conventionally placed on the surface of a form 40 by printing processes. These may be "sheet-press" printing or "web press" printing or other impact or non-impact imaging technologies. The fail-safe marks 70 and 170 of the present invention may be placed by the same printing processes and, preferably, in the same printing operation. In the embodiment shown in FIGS. 6–8, it might be efficient to have a standard solid black bar printed on the bottom surface 144 of all forms that would use a fail-safe mark 170. This would eliminate the need for individualized film, plates and set-up for printing on the bottom surface.

Although, the description of a preferred embodiment has been presented, it is contemplated that various changes could be made without deviating from the spirit of the present invention. Accordingly, it is intended that the scope of the present invention be dictated by the appended claims rather than by the description of the preferred embodiment.

What is claimed and desired to be protected by Letters Patent is:

1. A data processing form for use with photo-sensing apparatus that senses the presence of indicia in indicia-receiving locations on the form, said form comprising:
   a sheet of paper or like material having a first control mark column containing a plurality of control marks and a plurality of indicia-receiving locations in specified relation thereto on a first surface of said sheet; and
   a fail-safe mark on the second surface of said sheet, said fail-safe mark being opposite to but aligned with said first control mark column and having a length sufficient to connect at least two adjacent control marks on said first surface, were such control marks on the second surface of said sheet in a location immediately opposite their location on said first surface.

2. A data processing form as recited in claim 1 further comprising a second control mark column containing a plurality of control marks and a plurality of indicia-receiving locations in specified relation thereto on the second surface of said sheet.

3. A data processing form as recited in claim 2 wherein the first and second control mark columns have different numbers of control marks.

4. A data processing form as recited in claim 1 wherein the fail-safe mark connects two adjacent control marks.

5. A data processing form as recited in claim 1 wherein the fail-safe mark has a length and area not only sufficient to connect but also to cover at least two adjacent control marks on said first surface.

6. A data processing form as recited in claim 1 wherein there is at least one indicia-receiving location in specified relation to each of the at least two adjacent control marks associated with the fail-safe mark.

7. A method for making fail-safe a reflective-read data processing form of sheet material when such form is used in a photosensing apparatus of the type that senses the presence of indicia in indicia-receiving locations on the form by the transmitted-read method, comprising:

provㅤiding a first control mark column containing a plurality of control marks on a first surface of said sheet material in specified relation to a plurality of indicia receiving locations; and providing on the second surface of said sheet material a fail-safe mark opposite to but aligned with said first control mark column and having a length sufficient to connect at least two adjacent control marks on said first surface, were such control marks on the second surface of said sheet in a location immediately opposite their location on said first surface.

8. The method as recited in claim 7 wherein the step of providing a fail-safe mark comprises providing a fail-safe mark having a length and area not only sufficient to connect but also to cover at least two adjacent control marks on said first surface.

* * * * *